(12) United States Patent
Davison et al.

(10) Patent No.: US 8,753,183 B2
(45) Date of Patent: Jun. 17, 2014

(54) TECHNIQUES TO AUTOMATICALLY PROVIDE ASSISTANCE FOR ELECTRONIC GAMES

(75) Inventors: John Davison, San Rafael, CA (US); Simon Whitcombe, Alamo, CA (US); Robyn Tas, San Francisco, CA (US)

(73) Assignee: CBS Interactive, Inc., New York, NY (US)

( * ) Notice: Subject to any disclaimer, the term of this patent is extended or adjusted under 35 U.S.C. 154(b) by 27 days.

(21) Appl. No.: 13/288,761

(22) Filed: Nov. 3, 2011

(65) Prior Publication Data

US 2013/0116022 A1    May 9, 2013

(51) Int. Cl.
*A63F 13/00* (2014.01)

(52) U.S. Cl.
CPC ........... *A63F 13/00* (2013.01); *A63F 2300/301* (2013.01); *A63F 2300/305* (2013.01); *A63F 2300/403* (2013.01)
USPC ...................................... 463/9; 463/1; 463/7

(58) Field of Classification Search
CPC ..... A63F 13/00; A63F 13/12; A63F 2300/57; A63F 2300/301; A63F 2300/305; A63F 2300/403; A63F 2300/5546
USPC ...................................................... 463/1–15
See application file for complete search history.

(56) References Cited

U.S. PATENT DOCUMENTS

| | | | |
|---|---|---|---|
| 4,752,069 A * | 6/1988 | Okada | 463/23 |
| 6,625,661 B1 * | 9/2003 | Baldwin, Jr. | 709/250 |
| 2004/0097287 A1 * | 5/2004 | Postrel | 463/41 |
| 2004/0128250 A1 * | 7/2004 | Fox et al. | 705/52 |
| 2005/0209008 A1 * | 9/2005 | Shimizu et al. | 463/43 |
| 2005/0243093 A1 * | 11/2005 | Macauley et al. | 345/501 |
| 2005/0246638 A1 * | 11/2005 | Whitten | 715/708 |
| 2007/0294089 A1 * | 12/2007 | Garbow et al. | 705/1 |
| 2008/0004117 A1 * | 1/2008 | Stamper et al. | 463/42 |
| 2008/0004122 A1 * | 1/2008 | Macrae et al. | 463/42 |
| 2008/0119286 A1 * | 5/2008 | Brunstetter et al. | 463/43 |
| 2008/0148165 A1 * | 6/2008 | Zalewski | 715/764 |
| 2008/0194333 A1 * | 8/2008 | Zalewski | 463/42 |
| 2009/0088233 A1 * | 4/2009 | O'Rourke et al. | 463/7 |
| 2011/0193773 A1 * | 8/2011 | Uphill et al. | 345/156 |
| 2012/0021840 A1 * | 1/2012 | Johnson et al. | 463/43 |
| 2012/0100916 A1 * | 4/2012 | Zalewski | 463/36 |
| 2013/0005471 A1 * | 1/2013 | Chung et al. | 463/42 |

* cited by examiner

*Primary Examiner* — Dmitry Suhol
*Assistant Examiner* — David Duffy
(74) *Attorney, Agent, or Firm* — Kacvinsky Daisak Bluni PLLC

(57) ABSTRACT

Techniques to automatically provide assistance for electronic games are described. An apparatus may comprise a game strategy application arranged to receive as input game telemetry information representing gameplay of an electronic video game on a client device. The game strategy application may process the game telemetry information to determine whether a player of the electronic video game potentially needs assistance, and if so, automatically retrieve appropriate game strategy information from a local or remote datastore. The game strategy application may then send the retrieved game strategy information to the same or different client device. Other embodiments are described and claimed.

30 Claims, 14 Drawing Sheets

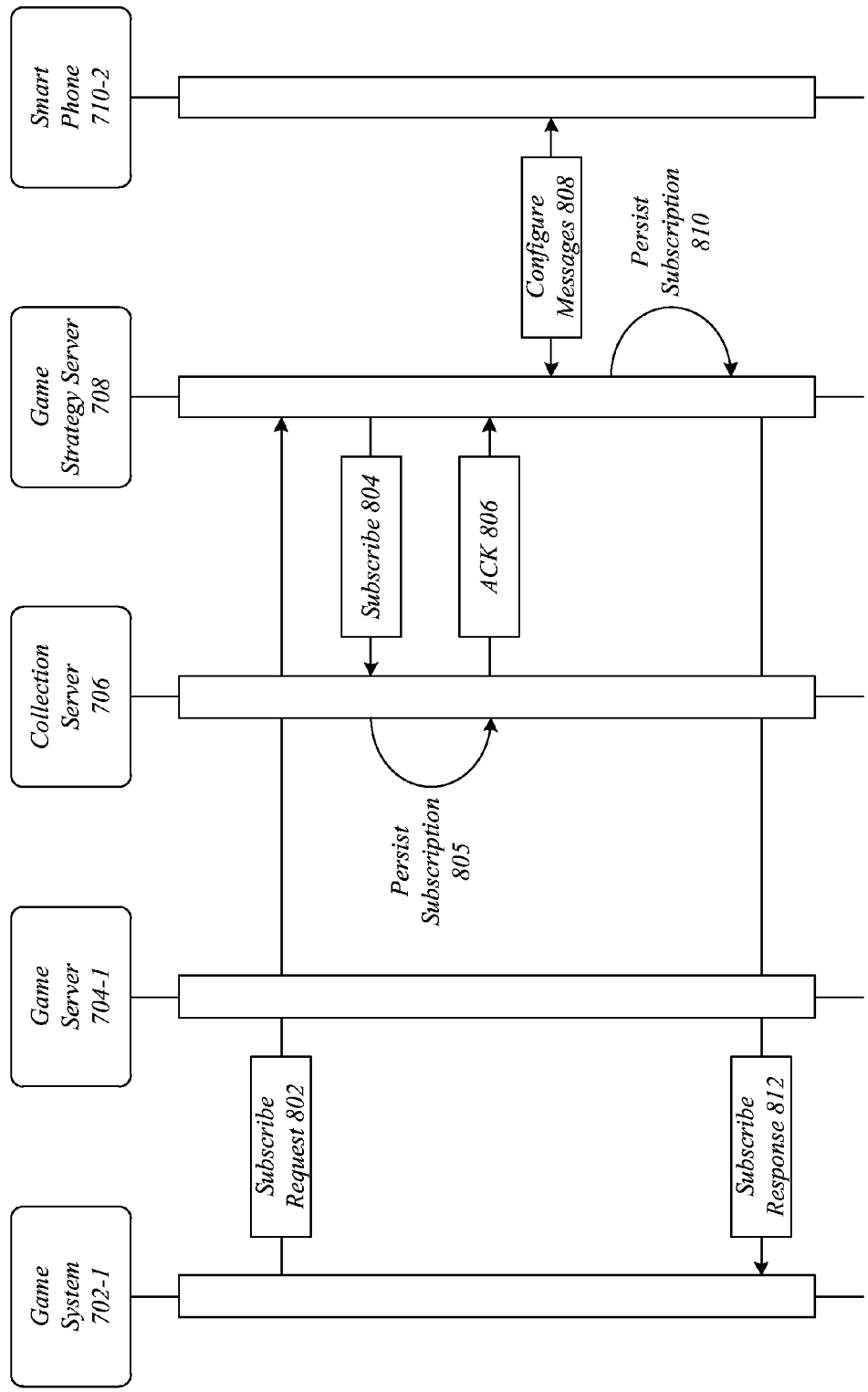

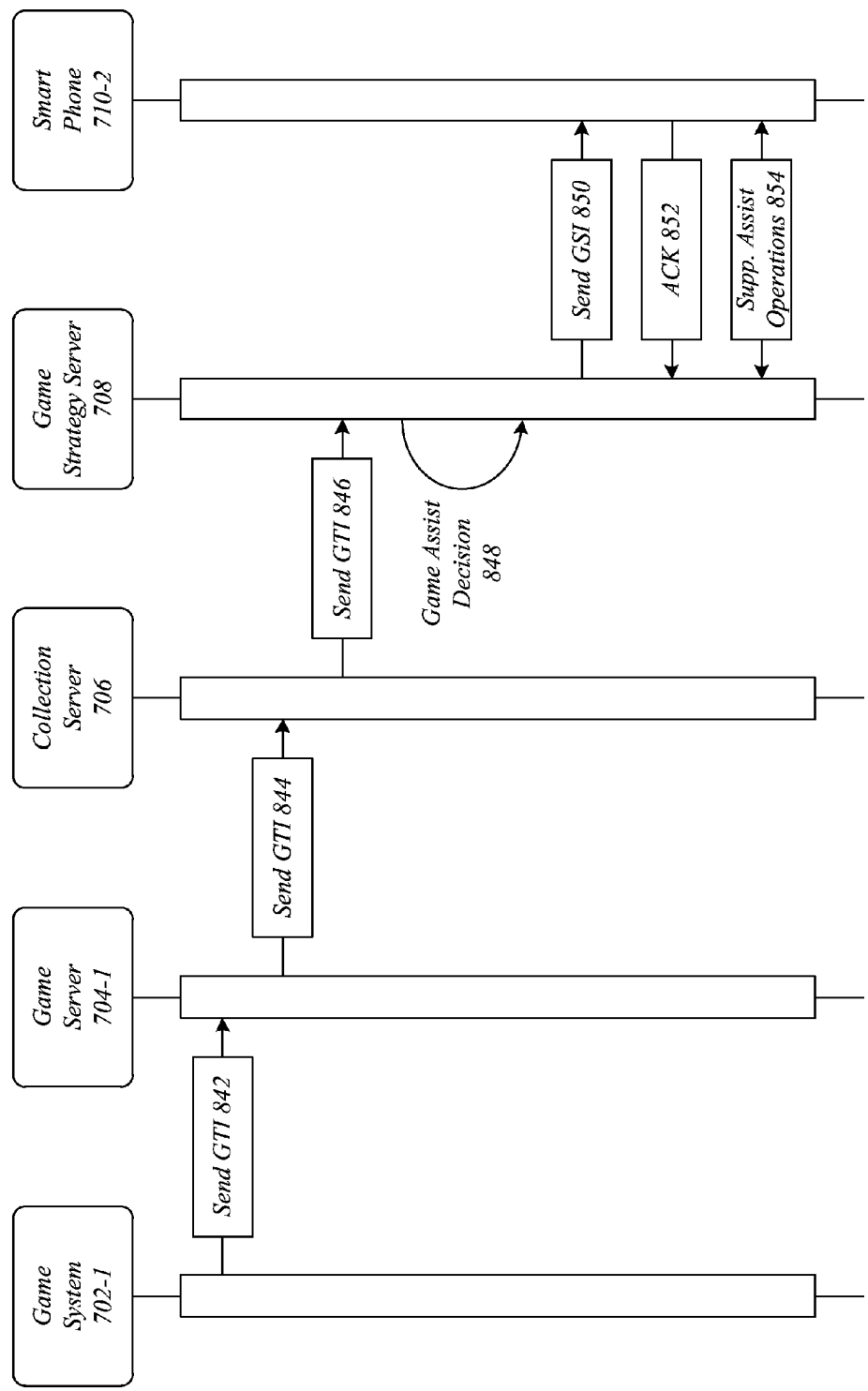

1000

RECEIVE GAME TELEMETRY INFORMATION REPRESENTING GAMEPLAY OF AN ELECTRONIC GAME FROM A CLIENT DEVICE
*1002*

DETERMINE WHETHER A PLAYER OF THE ELECTRONIC GAME NEEDS ASSISTANCE IN THE GAMEPLAY BASED ON THE GAME TELEMETRY INFORMATION
*1004*

SEND GAME STRATEGY INFORMATION TO ASSIST THE PLAYER OF THE ELECTRONIC GAME IN THE GAMEPLAY TO THE CLIENT DEVICE OR A DIFFERENT CLIENT DEVICE
*1006*

FIG. 10

TECHNIQUES TO AUTOMATICALLY PROVIDE ASSISTANCE FOR ELECTRONIC GAMES

BACKGROUND

Electronic games have grown in popularity and complexity over the years. Once limited to text interfaces and bit-mapped graphics, modern day electronic video games may increasingly provide stunning two and three dimensional high-definition graphics, complex gameplay, and challenging puzzles. Further, a convergence between media content companies and electronic video game companies is rapidly occurring. Traditional media content such as movies or television shows normally designed for pure viewer consumption are now including an interactive component similar to video games, ranging from companion and supplemental information for media content available online through a mobile device to actually changing a storyline for a show in response to electronic viewer feedback. Similarly, cinematic effects and storylines for electronic video games are approaching a quality that rivals big block-buster movies and animations. All of these trends and innovations have created a genre of electronic video games capable of providing higher quality and increasingly complex game playing experiences.

As a result of this increased complexity, a player of an electronic game may need increased levels of assistance or help while playing a game. In such cases, the player may take advantage of numerous solutions, ranging from purchasing hardware or software specifically designed to modify game conditions to accessing online help information (e.g., "cheat codes"). The latter option typically requires a disruption in gameplay. For instance, a player may need to pause a game, switch to a computer to perform an Internet search for help files, and resume gameplay once a solution is found. Such disruptions force a player to leave a gaming context for potentially extended periods of time, and shift focus from an entertainment experience to one of a work experience as the player enters information acquisition mode outside of the gaming context. These and other problems may potentially degrade gaming experience for a player. It is with respect to these and other considerations that the present improvements have been needed.

BRIEF DESCRIPTION OF THE DRAWINGS

FIG. 8A illustrates an embodiment of a first message flow.

FIG. 8C illustrates an embodiment of a third message flow.

FIG. 10 illustrates an embodiment of a logic flow for the system of FIG. 1.

DETAILED DESCRIPTION

Figure 1:
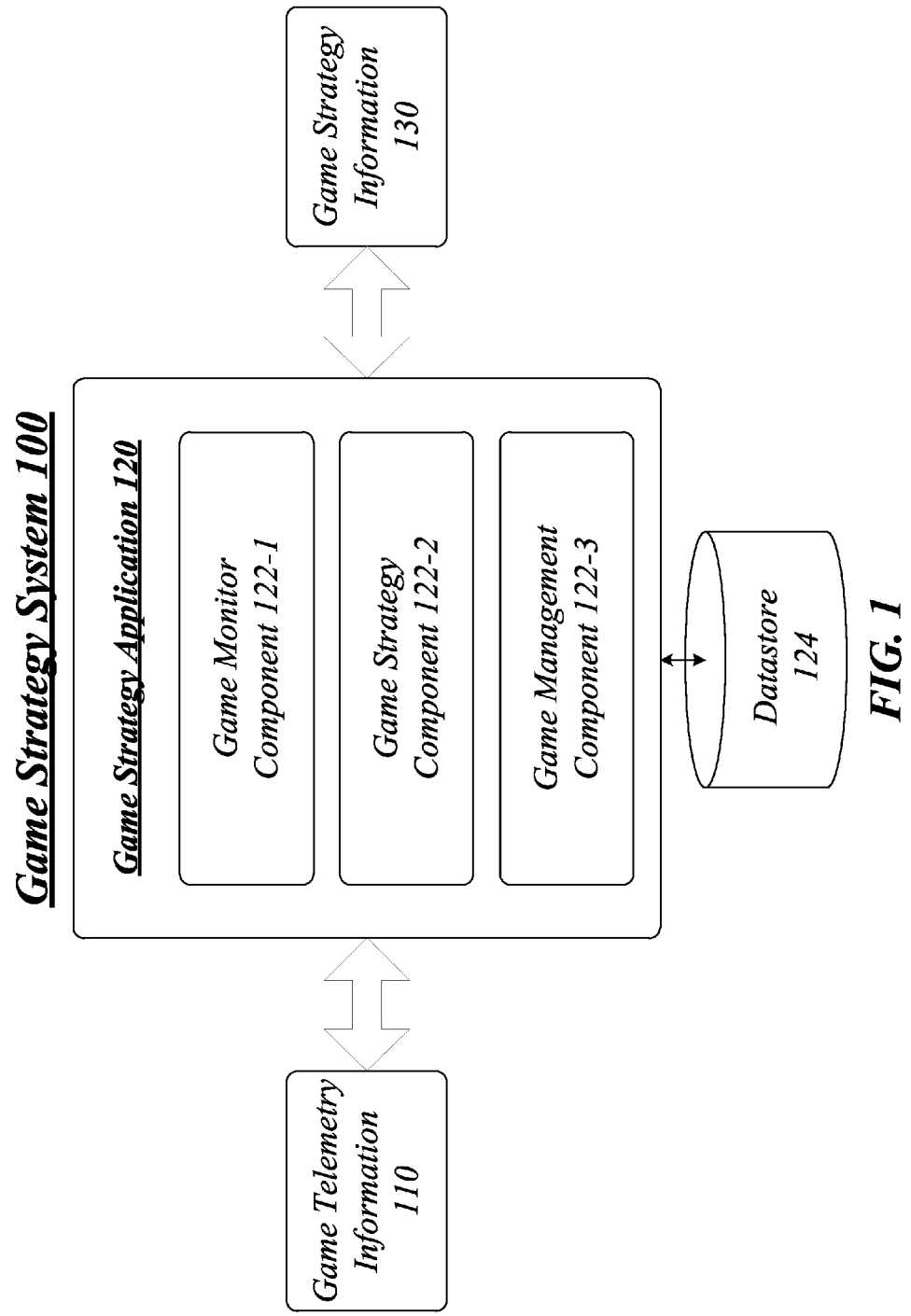
FIG. 1 illustrates an embodiment of a game strategy system.

Various embodiments are generally directed to electronic games. As used herein, the term "electronic game" refers to any game that employs electronics to create an interactive system with which a player can play at least a portion of the game. There are two general categories for electronic games. The first category includes electronic games that are completely played on some form of an electronic device or platform. Examples may include without limitation electronic video games, electronic audio games, electronic tactile games, electronic board games, handheld electronic games, specialized electronic games (e.g., pinball machines, slot machines, electro-mechanical arcade games, etc.), online games, and so forth. The second category includes electronic games that are partially played on some form of an electronic device or platform. In other words, an entire game does not necessarily need to be played on an electronic device, but rather utilizes an electronic device to play a portion of the game. For example, the second category may include live entertainment shows (e.g., television shows, reality television shows, game shows, award shows, etc.) with one or more contestants playing a game with an electronic component to play a portion of the game. Assume a television reality show offers a game with two sets of players. A first set of players may comprise reality television show contestants physically playing a game at a main geographic location. A second set of players may comprise viewers watching the reality television show and playing the game remotely via an electronic device and a communications network from different geographic locations from the main geographic location. A viewer may offer instructions to a contestant, vote on player activities or a contest outcome, play a companion game, and so forth. These are merely a few examples of first and second categories for electronic games, and other implementations exist as well. The embodiments are not limited in this context.

Some embodiments are particularly directed to techniques for automatically providing assistance for electronic video games. In one embodiment, game strategy information may be provided to a player of an electronic game on a different device from the one used to actually play the electronic game. In one embodiment, game strategy information may be provided on a same device as the one used to play the electronic game. Embodiments are not limited in this context.

In one embodiment, for example, a game strategy system may comprise a game strategy application arranged to receive as input game telemetry information representing gameplay of an electronic video game on a first client device. An example of the first client device may comprise a game system. The game strategy application may process the game telemetry information to determine whether a player of the electronic video game potentially needs assistance, and if so, automatically retrieve appropriate game strategy information from a local or remote datastore. The game strategy application may then send the retrieved game strategy information to a second client device. An example of the second client device may comprise a mobile device, such as a smart phone or tablet computer. The player may read the game strategy information from the second client device, and use the game strategy information to assist in gameplay of the electronic video game on the first client device. This embodiment significantly reduces an amount of time a player needs to leave a gaming context to acquire help information.

In one embodiment, for example, a game strategy system may comprise a game strategy application arranged to receive as input game telemetry information representing gameplay of an electronic video game on a game system. The game system may comprise, for example, a dedicated game system or a computer capable of playing different electronic video games. The game strategy application may process the game telemetry information to determine whether a player of the electronic video game potentially needs assistance, and if so, automatically retrieve appropriate game strategy information from a server. The game strategy information may include game strategy information from various intrinsic sources, such as native game strategy information provided by a manufacturer of the game system, a game system service provider, or a developer of the electronic video game. The game strategy information may also include game strategy information from various extrinsic sources, such as external game strategy information generated by third-parties or hosted by a third-party provider. The game strategy application may then send the retrieved game strategy information to the game system. The player may read the game strategy information from a graphical user interface (GUI) view or GUI element overlaid on a game screen for the game system, and use the game strategy information to assist in gameplay of the electronic video game on the first client device. The player may toggle assistance features on or off during gameplay as desired. This embodiment effectively eliminates the need for a player to leave a gaming context to acquire third-party help information.

Automatically presenting game strategy information to assist a player of an electronic video game in gameplay has several advantages over conventional solutions. For instance, conventional solutions typically require a disruption in gameplay. As previously described, a player may need to pause a game, switch to a computer to perform an Internet search for help files, and resume gameplay once a solution is found. Such disruptions force a player to leave a gaming context for potentially extended periods of time, and shift focus from an entertainment experience to one of a work experience as the player enters information acquisition mode outside of the gaming context. This degrades a gaming experience for the player. Automatically providing game strategy information on an as needed basis while a player is engaging in gameplay reduces or eliminates such disruptions. In one embodiment, a player may remain in a gaming context when receiving game strategy information. In another embodiment, a player may remain in a gaming context on a game system, briefly shift focus to check a nearby mobile device for game strategy information, and quickly shift back to the gaming context to implement the game strategy information. As a result, a player may have an improved gaming experience.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a game strategy system 100. In one embodiment, the game strategy system 100 may comprise a computer-implemented system having a game strategy application 120 comprising one or more components 122-a. Although the system 100 shown in FIG. 1 has a limited number of elements in a certain topology, it may be appreciated that the system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-a may include components 122-1, 122-2, 122-3, 122-4 and 122-5. The embodiments are not limited in this context.

The system 100 may comprise the game strategy application 120. The game strategy application 120 may be generally arranged to automatically manage game strategy information for one or more electronic games. The game strategy application 120 may receive as input game telemetry information 110 representing gameplay of an electronic video game. The game strategy application 120 may process the game telemetry information 110 to determine whether a player of the electronic video game potentially needs assistance, and if so, retrieve appropriate game strategy information 130 representing assistance information for the electronic video game from a local datastore 124 or a remote datastore (e.g., a network server). The game strategy application 120 may then send as output the game strategy information 130 to a client device for use by the player in playing the electronic video game.

Game telemetry information 110 may generally comprise any information or metadata available from one or more network devices accessible from the game strategy system 100 and useful in determining whether a player needs assistance in playing an electronic game or a type of assistance needed in playing an electronic game. Examples of game telemetry information 110 may include without limitation player information, client device information owned or operated by a player, input/output (I/O) device information used with a client device of a player, electronic game information, electronic game version information, electronic game developer information, game event information for an electronic game, game system information, game system manufacturer information, game service information, game service provider information, communications information, network information, and other similar types of information. The embodiments are not limited in this context.

Game strategy information 130 may generally comprise any information or metadata available from one or more network devices accessible from the game strategy system 100 and useful in providing assistance in playing an electronic game. Examples of game strategy information 130 may include without limitation multimedia help files, frequently asked question (FAQ) files, question and answer (Q&A) files, developer game secret files, cheats, cheat files, cheat codes, hints, strategies, advice, walkthroughs, and other similar types of information. The embodiments are not limited in this context.

Game strategy information 130 may be sourced or received from various different types of sources, including intrinsic sources and extrinsic sources. Intrinsic sources may refer to sources owned or provided by a manufacturer of a game system, a game system services provider or an electronic game developer. For instance, when an entity such as an enterprise business sells a game system and also provides sources of help information, such sources would be considered intrinsic sources since the sources are tightly integrated with the game system. Extrinsic sources may refer to sources not owned or provided by a manufacturer of a game system, a game system services provider or an electronic game developer, such as sources independently owned or provided by third-party providers. For instance, when a first entity such as an enterprise business sells a game system and a second entity such as a third-party enterprise business provides sources of help information, such sources would be considered extrinsic sources since the sources are not integrated with the game system. The embodiments are not limited in this context.

In the illustrated embodiment shown in FIG. 1, the game strategy application 120 may include a game monitor component 122-1, a game strategy component 122-2, and a game management component 122-3. It may be appreciated that more or less components 122-$a$ may be used for a given implementation. The embodiments are not limited in this context.

The application 120 may comprise a component 122-1. The game monitor component 122-1 may be generally arranged to monitor game telemetry information 110 arriving from one or more external information sources. The game telemetry information 110 may be real-time information, delayed information, or historical information. Real-time information is desired as it allows for more timely assistance decisions, although delayed and historical information may be used as well. The game monitor component 122-1 may monitor game telemetry information on a periodic, continuous or on-demand basis. The game monitor component 122-1 may analyze received game telemetry information 110 to determine whether a player needs assistance in playing an electronic game. When assistance is needed, the game monitor component 122-1 may store an indicator in an event queue, send a request for game strategy information 130 directly to the game strategy component 122-2, or some combination of both.

The application 120 may comprise a game strategy component 122-2. The game strategy component 122-2 may be generally arranged to locate, retrieve, generate, or otherwise collect game strategy information 130. The game strategy component 122-2 may search the datastore 124 for game strategy information 130. Additionally or alternatively, the game strategy component 122-2 may query and retrieve game strategy information 130 from a remote datastore implemented by a network server. For instance, the game strategy component 122-2 (or entire application 120) and the game strategy information 130 may be implemented as part of a cloud-based solution where computing is offered as a service rather than a product, such as part of an application platform infrastructure for a cloud computing model. The game strategy component 122-2 may then perform any processing needed for the game strategy information 130 (e.g., formatting, data schema translations, etc.), and output the game strategy information 130 for delivery to a client device of the player via a network connection.

The application 120 may comprise a game management component 122-3. The game management component 122-3 may be generally arranged to manage various operations of the game strategy application 120. For instance, the game management component 122-3 may manage subscribe operations to subscribe a player and/or client device to services provided by the game strategy application 120. Conversely, the game management component 122-3 may manage unsubscribe operations to unsubscribe a player and/or client device from services provided by the game strategy application 120. The game management component 122-3 may further perform player registration operations, player configuration operations, client device registration operations, game registration operations, game service registration operations, notification operations, authentication operations, permission operations, security operations, and various other operations needed for managing various products, features and services offered by the game strategy application 120.

In one use scenario, the game monitor component 122-1 of the game strategy application 120 may receive as input game telemetry information 110 representing gameplay of one or more electronic games, such as electronic video games, while played on a first client device. An example of the first client device may comprise a game system owned by the player. The game monitor component 122-1 may process the game telemetry information 110 to determine whether a player of the electronic video game needs assistance. When a player needs assistance, the game strategy component 122-2 may automatically retrieve appropriate game strategy information 130 for the electronic video game from a local datastore (e.g., datastore 124) or a remote datastore (e.g., a network datastore). The game strategy component 122-2 may then send the retrieved game strategy information 130 to a second client device. An example of the second client device may comprise a mobile device, such as a smart phone or tablet computer, also owned by the player. The player may read the game strategy information 130 from the mobile device, and use the game strategy information 130 to assist in gameplay of the electronic video game on the game system, with minimal disruptions to the gaming experience.

In another use scenario, the game monitor component 122-1 may receive as input game telemetry information 110 representing gameplay of an electronic video game on a client device, such as a game system, for example. The game monitor component 122-1 may process the game telemetry information 110 to determine whether a player of the electronic video game needs assistance. If so, the game strategy component 122-2 may programmatically retrieve appropriate game strategy information 130 from a local datastore (e.g., datastore 124) or a remote datastore (e.g., a network datastore). The game strategy component 122-2 may then send the game strategy information 130 to the same client device used to play the electronic video game, such as the game system. The player may read the game strategy information 130 from a GUI view or GUI element overlaid on a game screen for the game system, and the player may use the game strategy information to assist in gameplay of the electronic video game on the client device. The player may toggle assistance features on or off during gameplay on an as needed basis.

Figure 2:
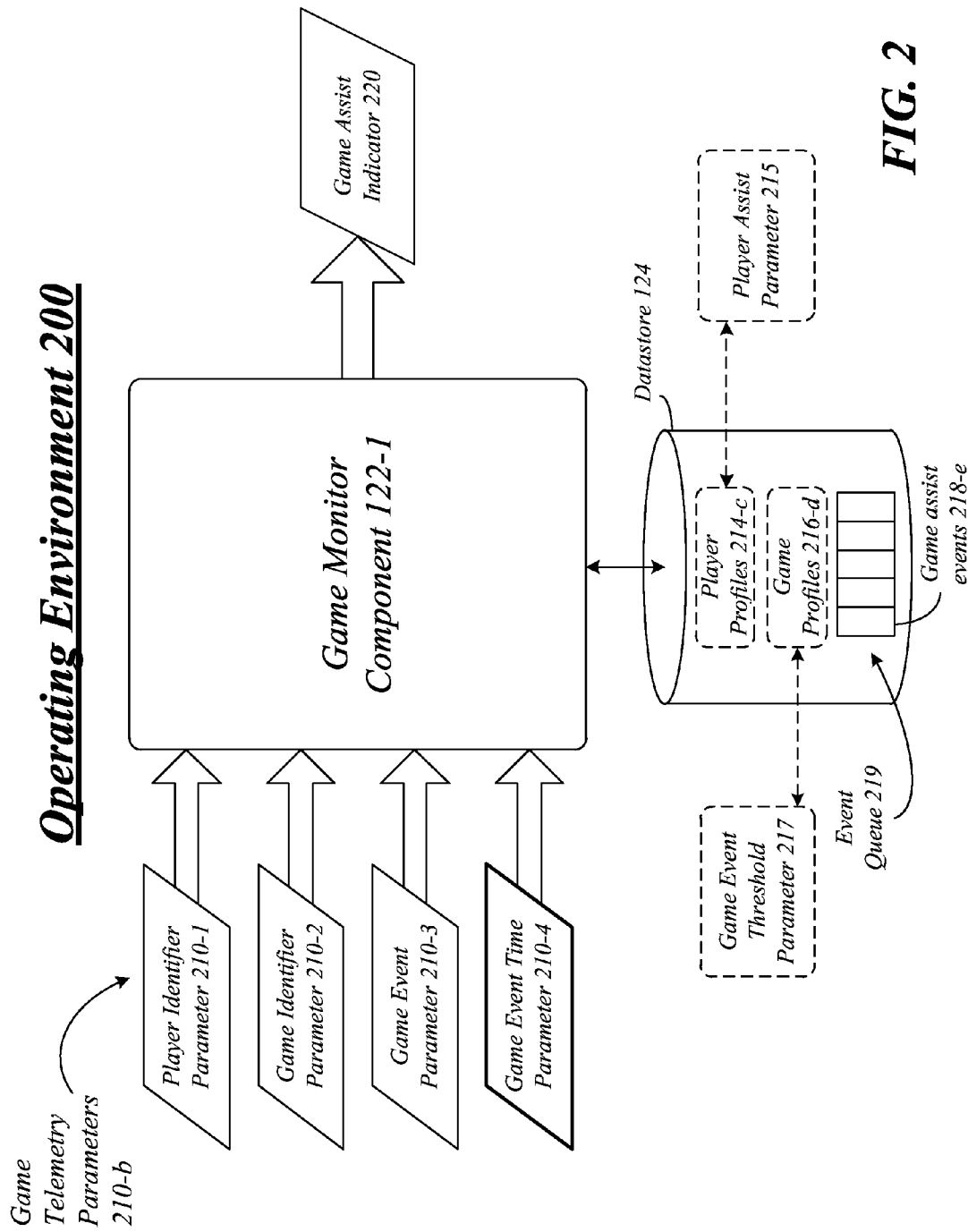
FIG. 2 illustrates an embodiment of a first operating environment.

FIG. 2 illustrates an embodiment of an operating environment 200. The operating environment 200 illustrates a more detailed implementation for a game monitor component 122-1 of the game strategy application 120 using a time-based trigger for providing player assistance.

As shown in the operating environment 200, the game monitor component 122-1 may be arranged to monitor one or more game telemetry parameters 210-$b$ of the game telemetry information 110 received by the game strategy application 120. The game monitor component 122-1 may determine whether a player of an electronic video game needs assistance for a game event during gameplay of the electronic video game based on the one or more game telemetry parameters 210-$b$. The game monitor component 122-1 may generate a game assist indicator 220 when a player needs assistance.

In one embodiment, for example, the game telemetry parameters 210-$b$ may include a player identifier parameter 210-1, a game identifier parameter 210-2, a game event parameter 210-3, and a game event time parameter 210-4. It may be appreciated that more or less parameters 210-$b$ may be used for a given implementation. The embodiments are not limited in this context.

A player identifier parameter 210-1 may comprise some form of unique identifier for a player. Examples of a player identifier parameter 210-1 may include without limitation a player name, a player identifier, a screen name, a login identifier, a gamer tag, a gamer account, a player globally unique identifier (GUID), player metadata, and so forth.

A game identifier parameter 210-2 may comprise a unique identifier for an electronic game, such as an electronic video game, for example. Examples of a game identifier parameter 210-2 may include without limitation a game name, a game identifier, a game serial number, a game version number, a game service identifier, game badges, game achievements, game awards, a game character, a game genre, a game theme, a game account, game metadata, a game GUID, and so forth.

A game event parameter 210-3 may comprise a unique identifier for a game event of an electronic video game. A game event may comprise a discrete portion of an electronic game. For an electronic video game, a game event may comprise a game challenge, a game puzzle, a game level, a mini-game, a game mission, a game objective, a game obstacle, and so forth. For example, an adventure game may have a main quest and multiple side quests, with the main quest and each side quest comprising a separate game event. Examples of a game event parameter 210-3 may include without limitation a game event name, a game event identifier, a game event badge, a game event achievement, a game event award, a game event character, a game event genre, a game event theme, game event metadata, a game event GUID, and so forth.

A game event time parameter 210-4 may comprise an amount of time associated with a game event of an electronic game. A game timer may be used to generate a game event time parameter 210-4 to indicate an amount of time a player has played a certain game event. For instance, in a first-person shooter game having a game event of a rescue mission to release hostages from a guarded location, a game event time parameter 210-4 may measure an amount of time a player has spent trying to accomplish the rescue mission.

The game monitor component 122-1 may receive a set of one or more game telemetry parameters 210-b, and decide whether to provide assistance to a player of an electronic game based on the received set of game telemetry parameters 210-b. As a threshold decision, the game monitor component 122-1 may determine whether a given player desires assistance for a given game. In one embodiment, for example, the game monitor component 122-1 may receive a player identifier parameter 210-1 representing some form of a unique identifier for the player, such as a player GUID. The game monitor component 122-1 may retrieve a player assist parameter 215 from a player profile 214-c associated with the player identifier parameter 210-1. The game monitor component 122-1 may determine whether to generate a game assist indicator 220 for the player based on a setting of the player assist parameter 215.

By way of example, assume a player desires to have assistance during gameplay of an electronic video game. The player may configure a player assist parameter 215 to a logical one (or TRUE), using the game management component 122-3 as described further below, to indicate gameplay assistance. When the game monitor component 122-1 receives a player identifier parameter 210-1 identifying the player, the game monitor component 122-1 may retrieve the player assist parameter 215 associated with the player identifier parameter 210-1 from a player profile 214-c associated with the player identifier parameter 210-1. The game monitor component 122-1 may detect that the player assist parameter 215 has been set to TRUE, and determine to generate a game assist indicator 220 for the player based on this setting.

Conversely, assume a player does not want any assistance during gameplay of an electronic video game. The player may configure a player assist parameter 215 to a logical zero (or FALSE), using the game management component 122-3 as described further below, to indicate gameplay assistance. When the game monitor component 122-1 receives a player identifier parameter 210-1 identifying the player, the game monitor component 122-1 may retrieve the player assist parameter 215 associated with the player identifier parameter 210-1 from a player profile 214-c associated with the player identifier parameter 210-1. The game monitor component 122-1 may detect that the player assist parameter 215 has been set to FALSE, and determine not to generate a game assist indicator 220 for the player based on this setting.

The player assist parameter 215 may be implemented to provide further granularity to indicate global assist preferences, game specific assist preferences, game system specific assist preferences, game event specific preferences, game account specific preferences, and so forth. The embodiments are not limited in this context.

In one embodiment, the game monitor component 122-1 may receive a set of four game telemetry parameters 210-b that include a game identifier parameter 210-1, a game identifier parameter 210-2, a game event parameter 210-3, and a game event time parameter 210-4. The game monitor component 122-1 may retrieve a game event threshold parameter 217 for a game event identified by the game event parameter 210-3 of an electronic video game identified by the game identifier parameter 210-2 from a game profile 216-d associated with the electronic video game. The game monitor component 122-1 may compare the game event time parameter 210-4, representing an amount of time a player has played the game event, with the game event threshold parameter 217, representing a threshold amount of time a player is allowed to play the game event before providing assistance, to form comparison results. The game monitor component 122-1 may generate a game assist indicator 220 based on the comparison results. For instance, if the game event time parameter 210-4 is greater than or equal to the game event threshold parameter 217, the game monitor component 122-1 may generate a game assist indicator 220. However, if the game event time parameter 210-4 is less than the game event threshold parameter 217, the game monitor component 122-1 may not generate a game assist indicator 220.

In those cases where the game monitor component 122-1 decides to generate a game assist indicator 220, the game monitor component 122-1 may store the game assist indicator 220 and associated game telemetry parameters 210-b as a game assist event 218-e in an event queue 219 of the datastore 124 for processing by other components of the game strategy application 120, such as the game strategy component 122-2, for example. It may be appreciated that although the game monitor component 122-1 and the game strategy component 122-2 are described using a datastore processing implementation by way of example and not limitation, other notification and processing solutions could be used as well. For instance, the game monitor component 122-1 may send a notification message or signal to the game strategy component 122-2, or output the game assist indicator 220 and associated game telemetry parameters 210-b directly to the game strategy component 122-2 for processing. In another example, the game monitor component 122-1 and the game strategy component 122-2 may be implemented using a distributed architecture, such as a Gearman application framework, where the game monitor component 122-1 operates as a client to originate game assist indicators 220, which are then sent to a jobs server for assignment to one or more worker machines each implementing an instance of the game strategy component 122-2. This may be desirable for large-scale commercial solutions where load balancing is a design factor. Other solutions may be implemented as well, and the embodiments are not limited in this context.

In addition to a game assist indicator 220 and associated game telemetry parameters 210-b, the game monitor component 122-1 may store other information as well for a game assist event 218-e. For instance, the game monitor component 122-1 may assign a priority level to a game assist indicator 220 for priority processing from the event queue 219, a latency value to a game assist indicator 220 for time-based processing from the event queue 219, or other special processing instructions for a game assist indicator. The embodiments are not limited in this context.

Figure 3:
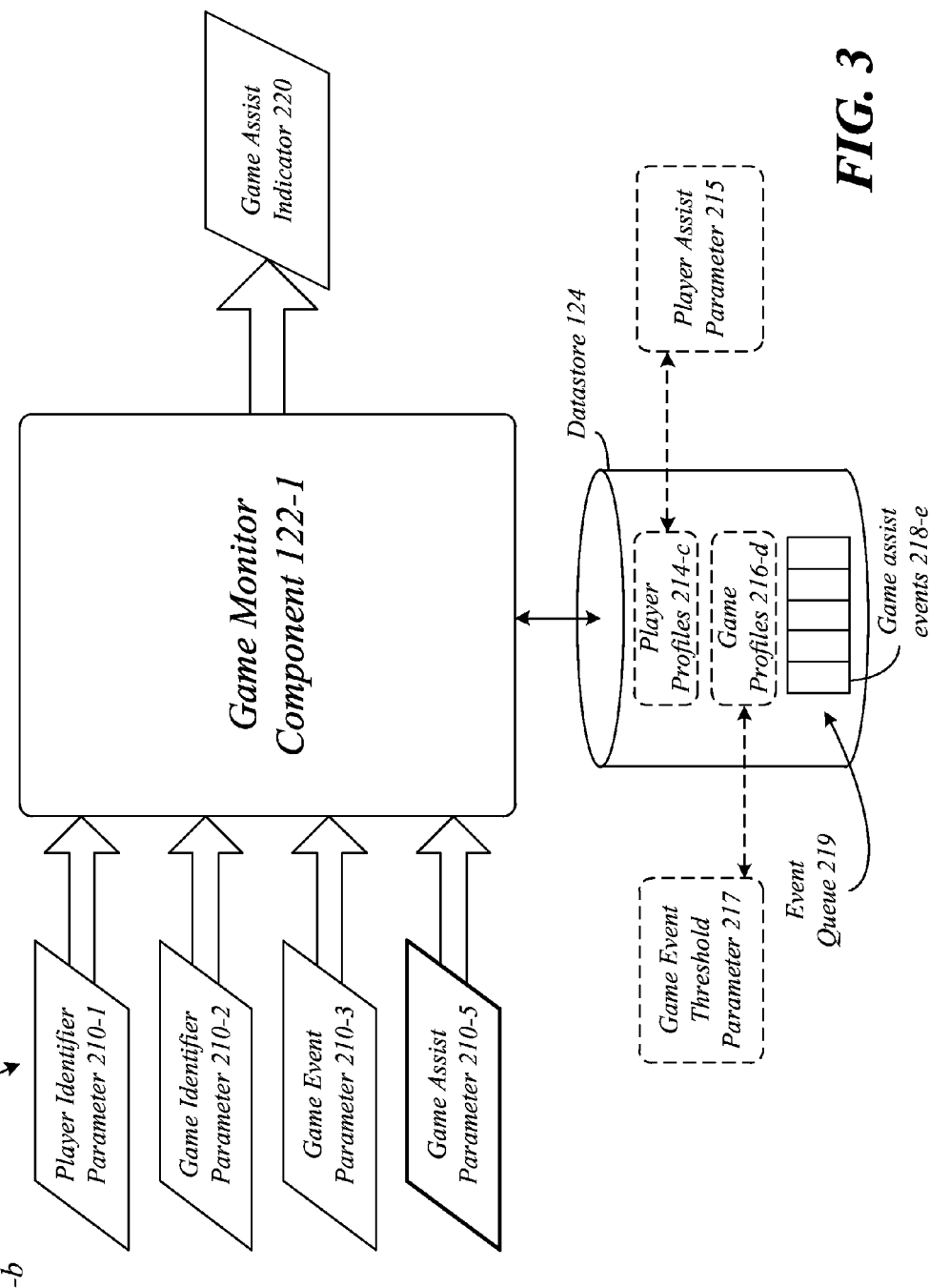
FIG. 3 illustrates an embodiment of a second operating environment.

FIG. 3 illustrates an embodiment of an operating environment 300. The operating environment 300 illustrates a more detailed implementation for a game monitor component 122-1 of the game strategy application 120 using a request-based trigger for providing player assistance.

The operating environment 300 is similar to the operating environment 200 as described with reference to FIG. 2. In the illustrated embodiment shown in FIG. 3, however, the operating environment 300 receives a game assist parameter 210-5 in addition to, or alternatively of, the game time parameter 210-4. The game assist parameter 210-5 may represent an explicit game assist request from a player associated with a game event of an electronic game. For instance, a player may be playing an electronic game and desire assistance. The player may press a button on a client device, such as a controller of a game system or mobile device, to activate a control directive to generate a game assist request for communication to the game strategy application 120 via a network. The game assist request may include a game assist parameter 210-5. Additionally or alternatively, the game assist request may further include information suitable for one or more game telemetry parameters 210-1 to 210-4.

In this case, the game monitor component 122-1 may receive a player identifier parameter 210-1, a game identifier parameter 210-2, a game event parameter 210-3, and a game assist parameter 210-5. The game monitor component 122-1 may generate a game assist indicator 220 for the game event of the electronic game in response to the game assist parameter 210-5. This may include processing the player identifier parameter 210-1, the game identifier parameter 210-2, and the game event parameter 210-3, as previously described with reference to operating environment 200. In some cases, it may not be necessary to examine the player profile 214-c to evaluate a player assist parameter 215 since the game assist parameter 210-5 provides explicit confirmation that a player needs assistance. In cases of conflict, the game monitor component 122-1 may select to follow the game assist parameter 210-5 as an indication of a current intention of a player.

Figure 4:
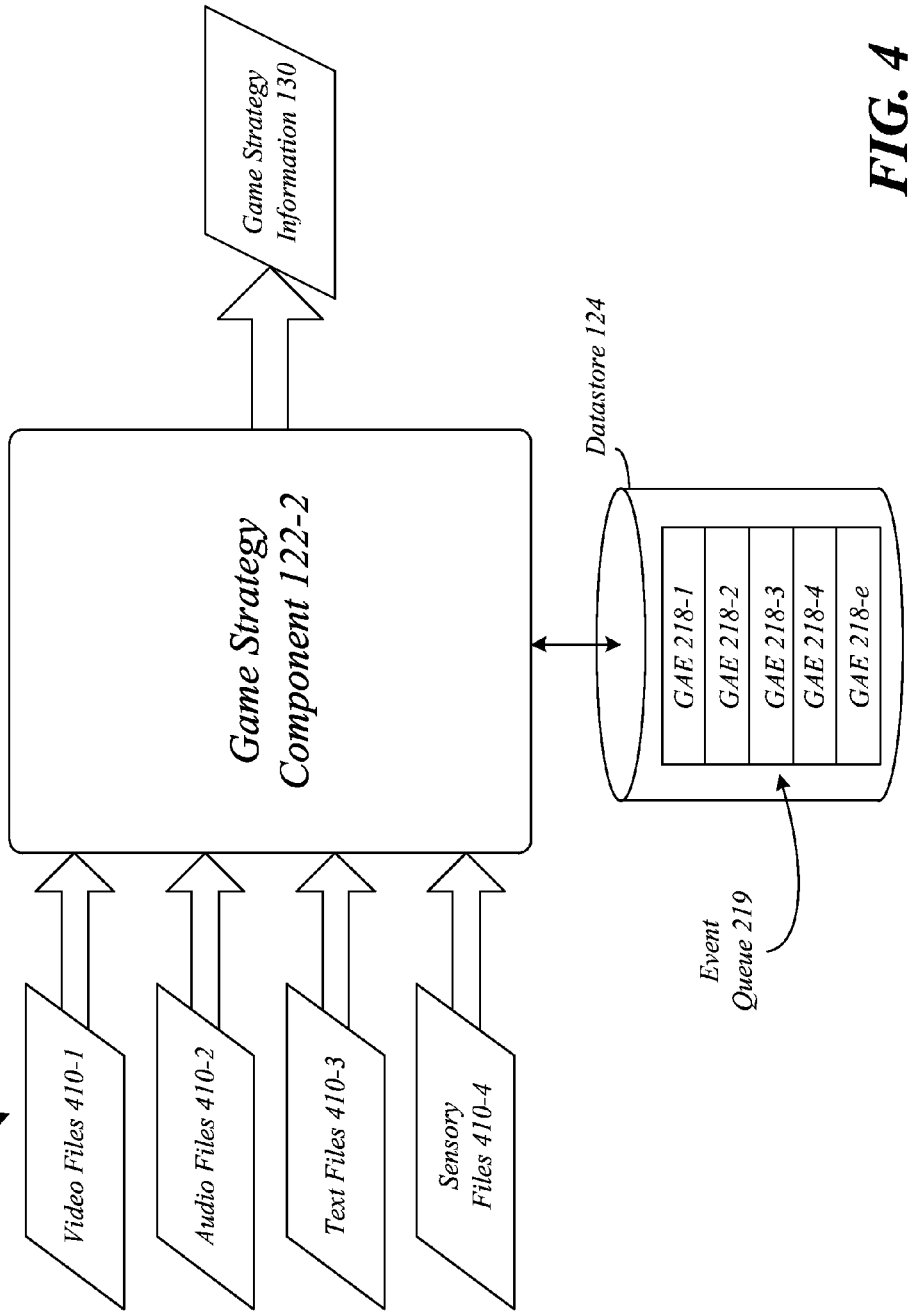
FIG. 4 illustrates an embodiment of a third operating environment.

FIG. 4 illustrates an embodiment of an operating environment 400. The operating environment 400 illustrates a more detailed implementation for a game strategy component 122-2 of the game strategy application 120 to process game assist indicators 220 for game assist events 218-e stored in the event queue 219.

As previously described with reference to the operating environment 200, in those cases where the game monitor component 122-1 decides to generate a game assist indicator 220, the game monitor component 122-1 may store the game assist indicator 220 and associated game telemetry parameters 210-b as a game assist event 218-e in an event queue 219 of the datastore 124 for processing by the game strategy component 122-2.

The game strategy component 122-2 may retrieve game assist events 218-e from the event queue 219. The game strategy component 122-2 may retrieve game assist events 218-e sequentially from the event queue 219 in a first-in-first-out (FIFO) manner or a last-in-first-out (LIFO) manner. The game strategy component 122-2 may also retrieve game assist events 218-e from the event queue 219 on a priority basis based on priority levels assigned by the game monitor component 122-1. Other retrieval techniques may be used as well, including interrupt techniques, parallel processing techniques, random access techniques, latency constraints, special processing instructions, and so forth. The embodiments are not limited in this context.

The game strategy component 122-2 may retrieve one or more game assist files 410-f for the game assist events 218-e. The game assist files 410-f may comprise discrete portions of game strategy information 130. Examples of game assist files 410-f may include without limitation multimedia help files, frequently asked question (FAQ) files, question and answer (Q&A) files, developer game secret files, cheats, cheat files, cheat codes, hints, strategies, advice, walkthroughs, and other similar types of information. In the illustrated embodiment shown in FIG. 4, the game strategy component 122-2 may retrieve or generate one or more videos files 410-1, audio files 410-2, text files 410-3, and sensory files 410-4. A sensory file 410-4 may comprise help information formatted for a particular sensory modality of a human being, such as tactile feedback for a touch sense, olfactory feedback for a smell sense, flavor feedback for a taste sense, and so forth. The embodiments are not limited in this context.

The game strategy component 122-2 may retrieve or generate a set of game assist files 410-f customized for a specific game assist event 218-e. For example, a game parameter 210-2 may identify a specific game, and the game strategy component 122-2 may retrieve or generate a set of game assist files 410-f customized for that specific game. In another example, a game event parameter 210-3 may identify a specific game event, and the game strategy component 122-2 may retrieve or generate a set of game assist files 410-f customized for that specific game event. In yet another example, a game assist parameter 210-5 may identify a specific assistance modality, such as visual help only, and the game strategy component 122-2 may retrieve or generate a set of video files 410-1 for a game. In still another example, a game assist parameter 210-5 may identify a specific type of assistance, such as a game event walkthrough, and the game strategy component 122-2 may retrieve or generate a set of text files 410-3 with the game event walkthrough. These are merely a few examples of customization of game strategy information 130 in general and game assist files 410-f in particular, and others may be used as well. The embodiments are not limited in this context.

The game strategy component 122-2 may send the one or more game assist files 410-f as game strategy information 130 to a client device. In one embodiment, the game strategy component 122-2 may send the one or more game assist files 410-f as a pass-through service without any pre-processing or post-processing operations, where the game assist files 410-f are sent to a client device as stored in the database 124. In one embodiment, the game strategy component 122-2 may process the game assist files 410-f to further customize game strategy information 130 for a given player, system or device. For instance, the game strategy component 122-2 may detect a device configuration for a client device as a mobile device, and configure the game assist files 410-*f* for presentation on a smaller display suitable for a mobile device. In another example, the game strategy component 122-2 may detect a data schema for an application or client device, and convert the game assist files 410-*f* to the appropriate data schema. In yet another example, the game strategy component 122-2 may detect a communications bandwidth for an application or client device, and convert the game assist files 410-*f* to an appropriate file size suitable for the given communications bandwidth. In still another example, the game strategy component 122-2 may detect a latency constraint for an application or client device, and segment or convert the game assist files 410-*f* to an appropriate file size capable of being sent within the latency constraint. These are merely a few examples of customization of game strategy information 130 in general and game assist files 410-*f* in particular, and others may be used as well. The embodiments are not limited in this context.

Figure 5:
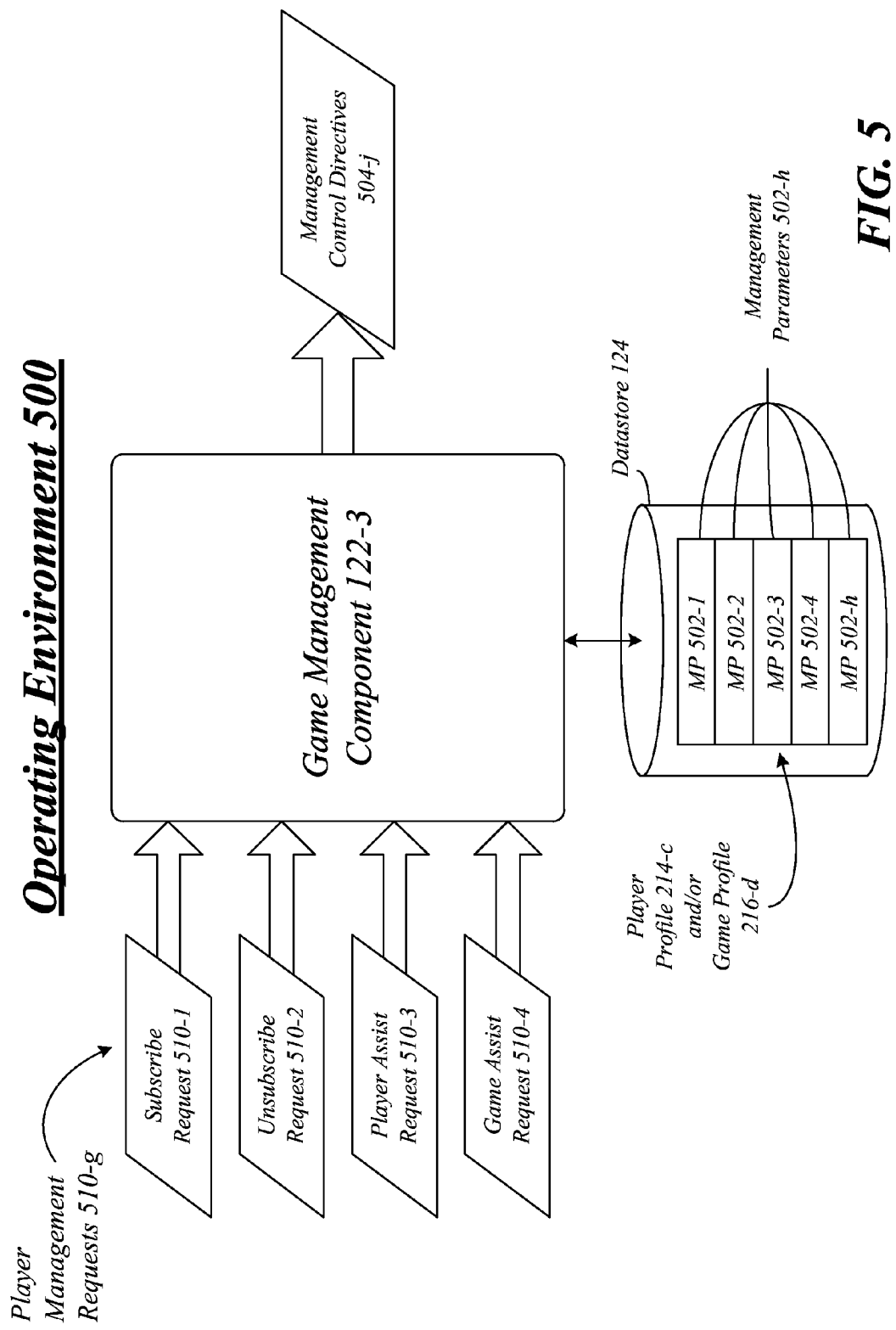
FIG. 5 illustrates an embodiment of a fourth operating environment.

FIG. 5 illustrates an embodiment of an operating environment 500. The operating environment 500 illustrates a more detailed implementation for a game management component 122-3 of the game strategy application 120 to process player management requests 510-*g*.

The game management component 122-3 may be generally arranged to manage various operations of the game strategy application 120. The game management component 122-3 may receive various types of player management requests 510-*g*, and configure the game strategy application 120 for player-specific operation.

The game management component 122-3 may manage subscribe operations to subscribe a player and/or client device to services provided by the game strategy application 120. For example, the game management component 122-3 may create and persist a subscription between a client device for the player and the game strategy application 120 in response to a subscribe request 510-1. The game management component 122-3 may receive a subscribe request 510-1 for a player, and execute a set of subscription operations to subscribe the player to the game strategy application 120. The subscription operations may solicit player information and preferences, and encode the player information and preferences using one or more management parameters 502-*h* stored in a player profile 214-*c*. The subscription operations may also solicit security information and preferences, and encode the security information and preferences using one or more management parameters 502-*h* stored in a player profile 214-*c*. The subscription operations may also solicit payment and account information and preferences, and encode the payment information and preferences using one or more management parameters 502-*h* stored in a player profile 214-*c*. The subscription operations may also solicit authentication information and preferences, and encode the authentication information and preferences using one or more management parameters 502-*h* stored in a player profile 214-*c*. The subscription operations may also solicit game information and preferences, and encode the game information and preferences using one or more management parameters 502-*h* stored in a game profile 216-*d*. The subscription operations may also solicit game event information and preferences, and encode the game event information and preferences using one or more management parameters 502-*h* stored in a game profile 216-*d*.

The game management component 122-3 may also manage unsubscribe operations to unsubscribe a player and/or client device to services provided by the game strategy application 120. Unsubscribe operations are typically paired operations with a subscription event. For example, the game management component 122-3 may locate and delete a subscription between a client device for the player and the game strategy application 120 stored in the database 124 in response to an unsubscribe request 510-2. This may include removing or uninstalling any client versions of the game strategy application 120 previously installed on a client device for a player.

In addition to subscribe and unsubscribe operations, which are typically performed before or after gameplay of an electronic game, the game management component 122-3 may also manage various requests from a player or a game during gameplay of an electronic game. For instance, the game management component 122-3 may receive a player assist request 510-3 from a player requesting a change in a setting for a player assist parameter 215 from no assistance (FALSE) to assistance (TRUE), or vice-versa. In another example, the game management component 122-3 may receive a player assist request 510-3 from a player requesting a change in a setting for a game event threshold parameter 217 from a lower threshold value (e.g., 10 minutes) to a higher threshold value (e.g., 15 minutes), or vice-versa. In yet another example, the game management component 122-3 may receive a game assist request 510-4 from a player or a game requesting a change in communications bandwidth to a higher bandwidth for an electronic video game with high definition graphics or a lower bandwidth for an electronic video game with normal graphics. These are merely a few examples of customization of management operations for the game strategy application 120, and the game management component 122-3 may perform others as well. For instance, the game management component 122-3 may further perform player registration operations, player configuration operations, client device registration operations, game registration operations, game service registration operations, notification operations, authentication operations, permission operations, security operations, and various other operations needed for managing various products, features and services offered by the game strategy application 120. The embodiments are not limited in this context.

Figure 6:
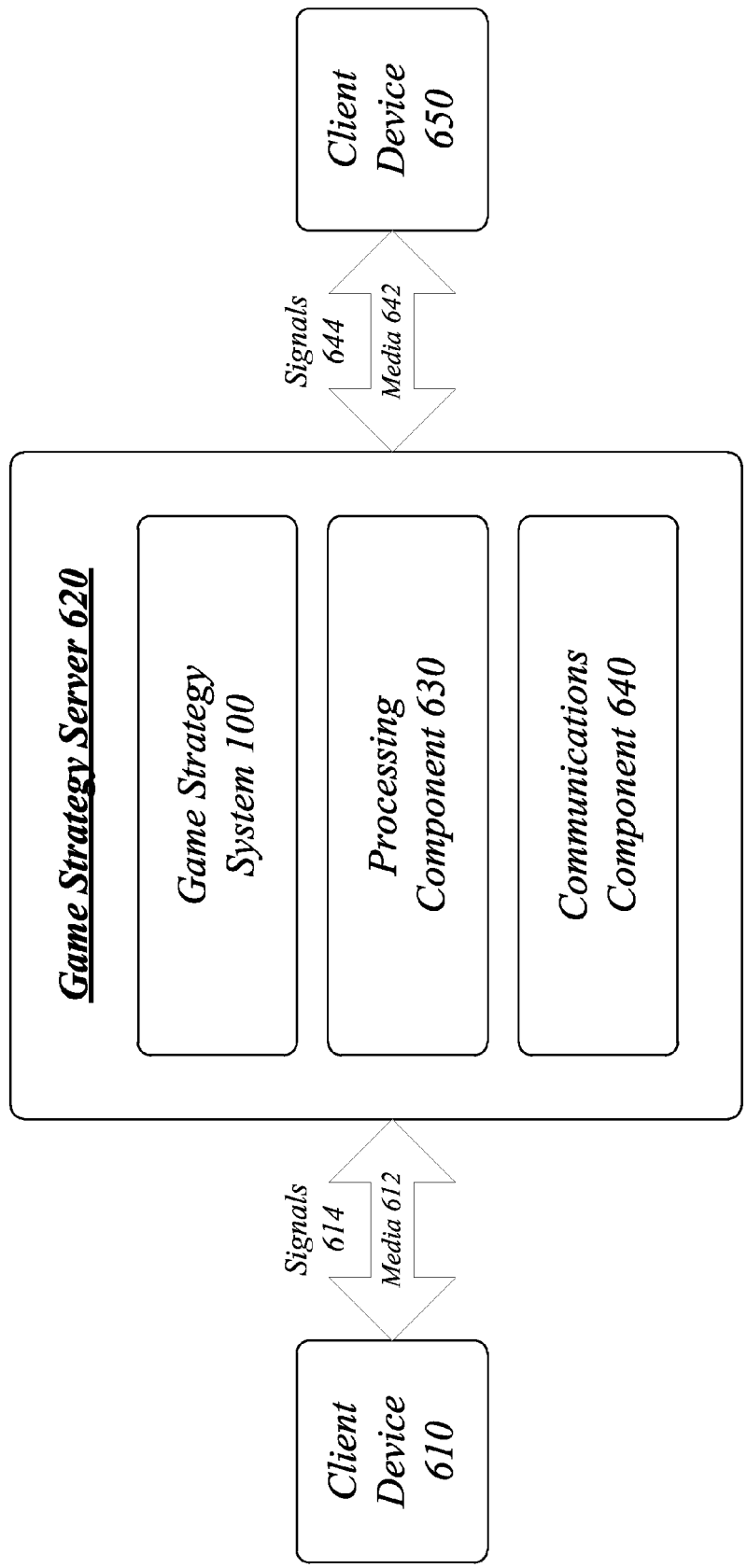
FIG. 6 illustrates an embodiment of a centralized system for the game strategy system of claim 1.

FIG. 6 illustrates a block diagram of a centralized system 600. The centralized system 600 may implement some or all of the structure and/or operations for the game strategy system 100 in a single computing entity, such as entirely within a single device. For example, the game strategy system 100 may be implemented by a game strategy server 620 accessible via different communications systems and networks.

The device 620 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 620 may execute processing operations or logic for the system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 620 may execute communications operations or logic for the system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612, 642 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 620 may communicate with other devices 610, 650 over a communications media 612, 642, respectively, using communications signals 614, 644, respectively, via the communications component 640. The devices 610, 650 may be internal or external to the device 620 as desired for a given implementation.

The game strategy server 620 may comprise part of an overall communications system or network capable of communicating information between the game strategy server 620 and one or more client devices 610, 650 for a player.

In various embodiments, the client device 610 may comprise or be implemented as a game system with associated controllers and input/output (I/O) devices. The game system may comprise a console game system, such as an Xbox® 360 game system made by Microsoft® Corporation, a PlayStation® 3 or PS3® made by Sony® Computer Entertainment, a Wii® made by Nintendo®, and so forth. The game system may comprise a handheld game system, such as a Sony PS Vita®, a Sony PlayStation Portable (PSP)®, a Nintendo 3DS, a Nintendo DS, and so forth. The game system may comprise a general purpose computing device capable of playing a game, such as a personal computer (PC) or notebook computer with gaming software. The gaming software may comprise a full version of an electronic video game loaded on the computing device, a partial version of an electronic video game loaded as a thin-client on the computing device with game content on a network server, or a web browser configured to access an electronic video game implemented as a web application or web service on a game server. An example of a thin-client or browser-based version of a game may include Steam® developed by Valve Corporation. Steam software is a digital distribution, digital rights management, multiplayer and communications platform used to distribute electronic games and related media online. The electronic games may be made by any number of game publishers, including without limitation including Bethesda® Softworks, Electronic Arts®, Activision®, Rockstar Games®, Square Enix®, 2K Games®, and Telltale Games®, among others.

In various embodiments, the client device 610 may comprise or be implemented as a mobile device having both computing and communications capabilities, such as a notebook computer, a handheld computer, a smart phone, a tablet computer, a remote control, a smart remote control, and so forth. The client device 610 may also comprise or be implemented as a fixed device having both computing and communications capabilities, such as a desktop computer, workstation, digital television, smart television, set top box (STB) or digital media transceiver, audio/video (AV) receiver, consumer appliance, a game system, and so forth.

In one embodiment, the client device 610 may operate primarily as an input device generating and sending game telemetry information 110 to the game strategy application 120, and the client device 650 may operate primarily as an output device receiving and presenting game strategy information 130 from the game strategy application 120. In one embodiment, the client device 610 may operate as both an input device generating and sending game telemetry information 110 to the game strategy application 120, and an output device receiving and presenting game strategy information 130 from the game strategy application 120. In this case, the client device 650 may not be needed to receive and present the game strategy information 130.

Figure 7:
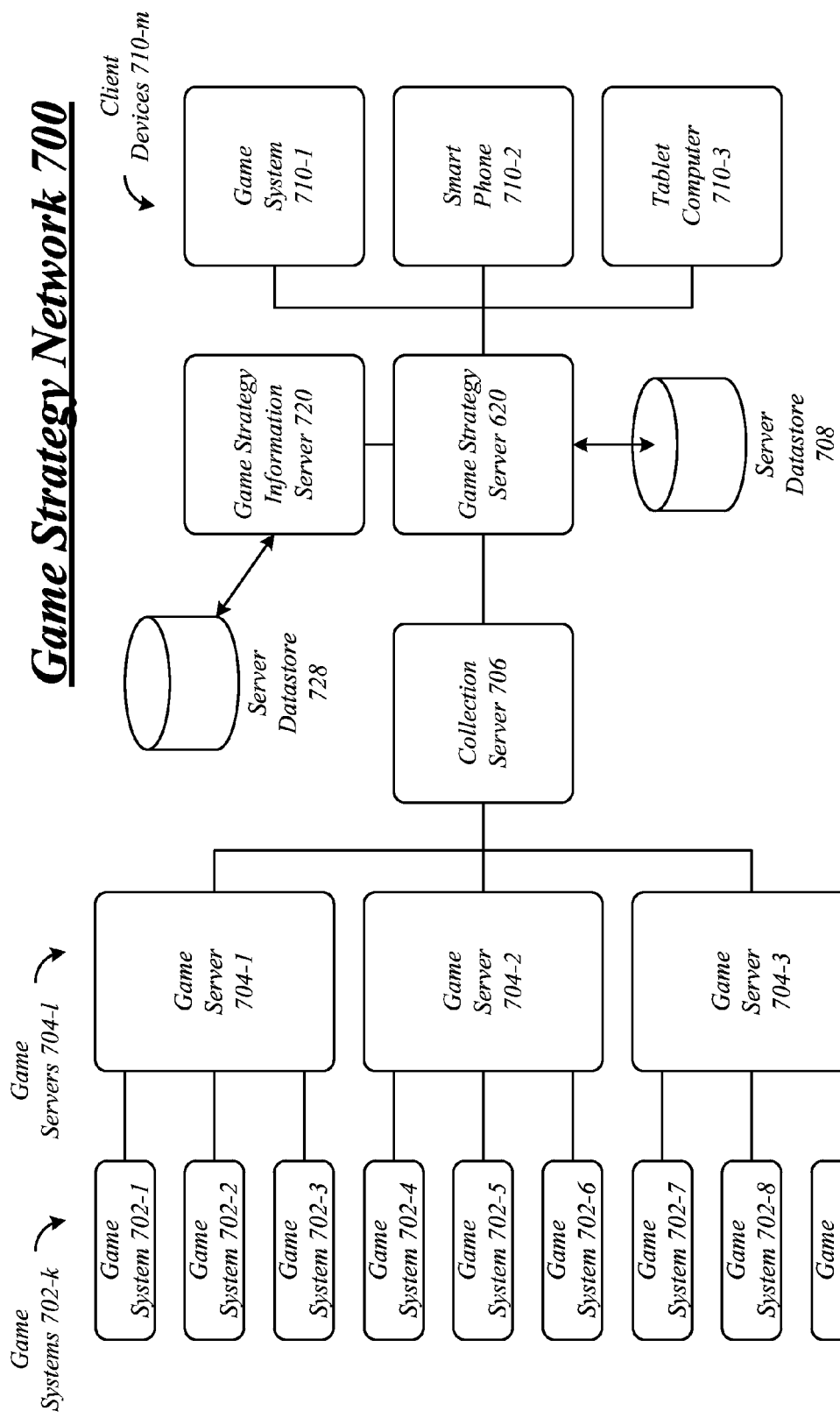
FIG. 7 illustrates an embodiment of a game strategy network.

FIG. 7 illustrates an embodiment of a game strategy network 700. The game strategy network 700 may implement a game strategy system 100 as part of a game strategy server 620 having a server datastore 708.

The game strategy server 620 may be connected to various sources of game telemetry information 110. As shown in FIG. 7, the game strategy server 620 may be communicatively connected to a collection server 706. The collection server 706 may be communicatively connected to one or more game servers 704-*l*. The collection server 706 may be arranged to collect and receive game telemetry information 110 from various game servers 704-*l*. An example of a collection server 706 may include a Raptr® game tracking platform integrating data feeds from various game servers 704-*l*. The game servers 704-*l* may comprise or implement online gaming services, such as Xbox LIVE® provided by Microsoft, PlayStation Network provided by Sony, and so forth. The game servers 704-*l* may in turn be communicatively connected to one or more game systems 702*k*. The game systems 702-*k* may include those examples provided for the client device 610 as described with reference to FIG. 6, among others.

The game strategy server 620 may also be connected to various sources of game strategy information 130. For instance, the game strategy server 620 may implement the game strategy system 100 having the game strategy application 120 connected to the datastore 124 storing game strategy information 130. Additionally or alternatively, the game strategy server 620 may be connected to a server datastore 708 storing game strategy information 130. Additionally or alternatively, the game strategy server 620 may be connected to a game strategy information server 720 specifically designed to store game strategy information 130 for various electronic games.

The game strategy server 620 may be further connected to various sinks of game strategy information 130. For example, the game strategy server 620 may be communicatively connected to one or more client devices 710-*m* for a player. Examples of client devices 710-*m* may include those examples provided for the client device 650 as described with reference to FIG. 6, among others. As shown in FIG. 7, the client devices 710-*m* may include a game system 710-1, a smart phone 710-2, and a tablet computer 710-3. In one embodiment, the game system 710-1 may comprise a separate game system from the game systems 702-*k*. In one embodiment, the game system 710-1 may comprise one of the game system 702-*k*. For example, the game system 702-1 and the game system 710-1 may comprise the exact same game system both sending game telemetry information 110 and receiving game strategy information 130.

In operation, various players may engage in gameplay of various electronic games using the game systems 702-*k*. During gameplay, each of the game servers 704-*l* may collect information about the players and the electronic games while being played to form game telemetry information 110. The game servers 704-*l* may forward the game telemetry information 110 to the collection server 706. Alternatively, the game servers 704-*l* may forward the game telemetry information 110 directly to the game strategy server 620. The game strategy server 620 may receive the game telemetry information 110, decide when to render assistance to a player while playing an electronic game, and retrieve game strategy information 130 from a local database, such as datastores 124, 126, or a remote database implemented by the game strategy information server 720, such as server datastore 728. The game strategy server 620 may forward the game strategy information 130 to one or more of the client devices 710-*m*. A player may then use the client devices 710-*m* to review the game strategy information 130 to assist in gameplay of an electronic game.

FIG. 8A illustrates an embodiment of a message flow 800. The message flow 800 illustrates exemplary subscribe operations to subscribe a player and client devices 610, 650 to the game strategy server 708. It may be appreciated that the message flow 800 is by way of example and not limitation. Other message flows or signaling schemes may be used to perform subscribe operations as desired for a given implementation.

In the illustrated embodiment shown in FIG. 8A, a player may use a game system 702-1 to initiate subscribe operations by sending a subscribe request 802 to the game strategy server 708. Alternatively, a player may use a client device 710-*m*, such as table computer 710-3, having a web browser to access a web application or web service provided by the game strategy server 708 to perform subscribe operations.

In either case, the game strategy server 708 receives the subscribe request 802, and sends a subscribe request 804 to the collection server 706 to initiate forwarding of game telemetry information 110 from the game system 702-1 to the game strategy server 708. The collection server 706 sends an acknowledgement (ACK) 806 indicating it has persisted the subscription 805 by storing in a local datastore for the collection server 706. Alternatively, the player may use a client device 710-*m*, such as table computer 710-3, having a web browser to access a web application or web service provided by the collection server 706 to perform subscribe operations, such as registering the game system 702-1 for monitoring by the collection server 706. In this case, the collection server 706 may automatically begin sending game telemetry information 110 from the game system 702-1 without an explicit request from the game strategy server 708.

Once a subscription with the collection server 706 has been established, the game strategy server 708 may send one or more configure messages 808 to one or more client devices 710-*m*, such as the smart phone 710-2. The configure messages 808 may include messages to test a connection, install client software such as a thin-client application, configure operating parameters for a client device 710-*m*, configure security features, configure presence information for a client device 710-*m*, configure messaging applications on a client device 710-*m* for delivery of game strategy information 130, and so forth.

Once a client device 710-*m* has been configured for operation with the game strategy server 708, the game strategy server 708 may persist the subscription 810 to a datastore (e.g., datastores 124, 708). The game strategy server 708 may then send a subscribe response 812 to the game system 702-1 (or another client device 710-*m*) with subscription results (e.g., subscription complete, subscription error, etc.).

Figure 8B:
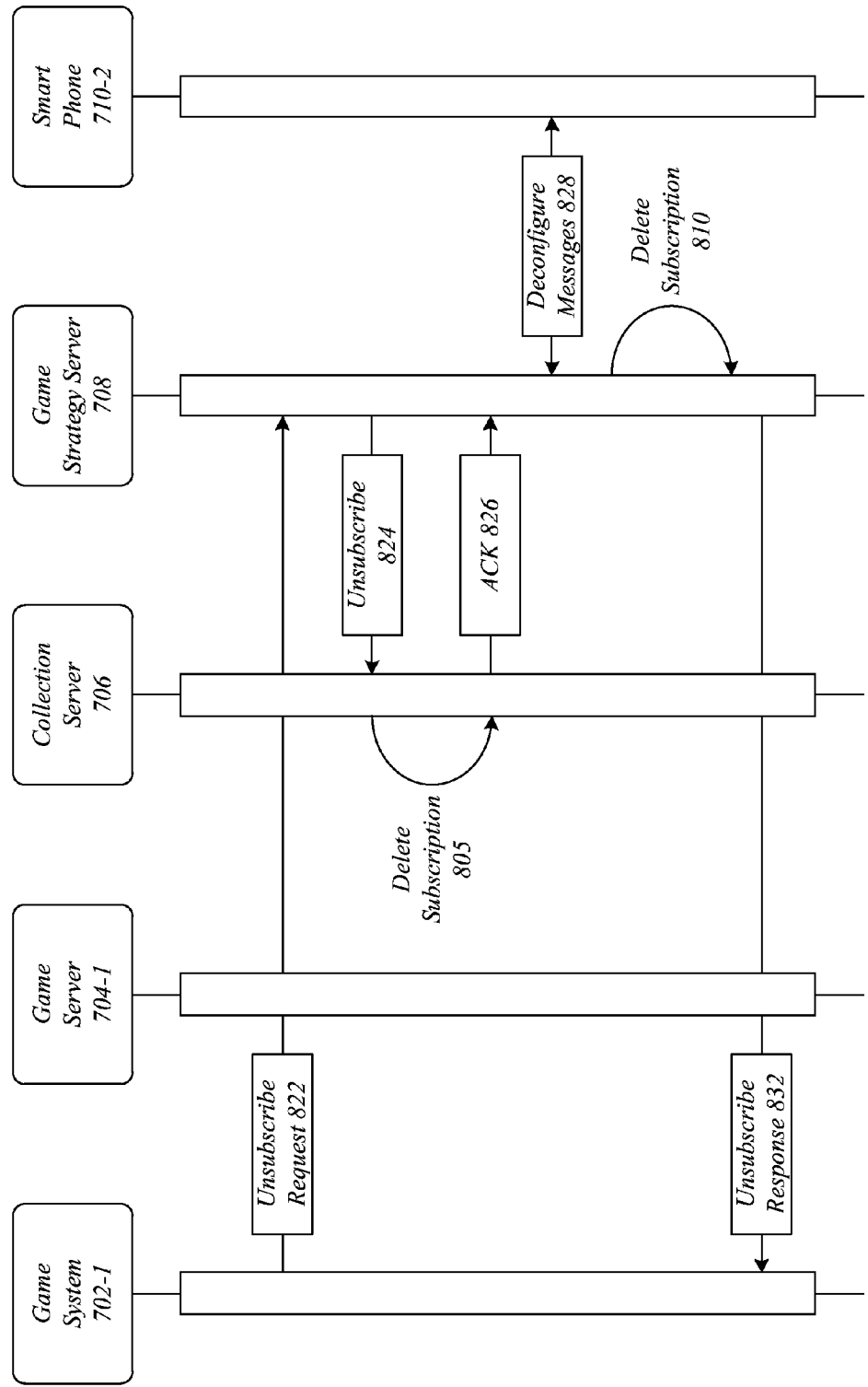
FIG. 8B illustrates an embodiment of a second message flow.

FIG. 8B illustrates an embodiment of a message flow 820. The message flow 820 illustrates exemplary unsubscribe operations to unsubscribe a player and client devices 610, 650 from the game strategy server 708. It may be appreciated that the message flow 820 is by way of example and not limitation. Other message flows or signaling schemes may be used to perform unsubscribe operations as desired for a given implementation.

In the illustrated embodiment shown in FIG. 8B, a player may use a game system 702-1 to initiate unsubscribe operations by sending an unsubscribe request 822 to the game strategy server 708. Alternatively, a player may use a client device 710-*m*, such as table computer 710-3, having a web browser to access a web application or web service provided by the game strategy server 708 to perform unsubscribe operations.

In either case, the game strategy server 708 receives the unsubscribe request 822, and sends an unsubscribe request 824 to the collection server 706 to stop forwarding game telemetry information 110 from the game system 702-1 to the game strategy server 708. The collection server 706 sends an acknowledgement (ACK) 826 indicating it has located and deleted the subscription 805 from the local datastore of the collection server 706. Alternatively, the player may use a client device 710-*m*, such as table computer 710-3, having a web browser to access a web application or web service provided by the collection server 706 to perform unsubscribe operations, such as unregistering the game system 702-1 for monitoring by the collection server 706. In this case, the collection server 706 may automatically stop sending game telemetry information 110 from the game system 702-1 without an explicit request from the game strategy server 708.

Once the subscription with the collection server 706 has been removed, the game strategy server 708 may send one or more deconfigure messages 828 to one or more client devices 710-*m*, such as the smart phone 710-2. The deconfigure messages 828 may undo any previous configuration operations performed for the smart phone 710-2.

Once a client device 710-*m* has been removed from operation with the game strategy server 708, the game strategy server 708 may locate and delete the subscription 810 from a datastore (e.g., datastores 124, 708). The game strategy server 708 may then send an unsubscribe response 832 to the game system 702-1 (or another client device 710-*m*) with the unsubscribe results (e.g., subscription deleted, unsubscribe error, etc.).

FIG. 8C illustrates an embodiment of a message flow 840. The message flow 840 illustrates exemplary notification operations to automatically deliver game strategy information 130 to a player via client devices 610, 650 from the game strategy server 708. It may be appreciated that the message flow 840 is by way of example and not limitation. Other message flows or signaling schemes may be used to perform notification operations as desired for a given implementation.

In the illustrated embodiment shown in FIG. 8C, assume a player is playing an electronic game, such as an electronic video game titled "The Elder Scrolls V: Skyrim" made by Bethesda® Game Studios on a game system 702-1 such as a Sony PS3. Further assume a player subscribes to a game service PlayStation Network via the game server 704-1. As the player is playing the electronic video game, the game system 702-1 may be sending game telemetry information 110 via messages 842 representing gameplay actions performed by the player to the game server 704-1 in real-time. The game server 704-1 may forward the game telemetry information 110 via messages 844 to the collection server 706. The collection server 706 may process the game telemetry information 110 to clean up the data and remove any artifacts or non-useful information, and forward the processed game telemetry information 110 via messages 846 to the game strategy server 708. The game strategy application 100 implemented by the game strategy server 708 may receive the game telemetry information 110, make a game assist decision 848, and arrange for delivery of game strategy information 130 to the smart phone 710-2. The smart phone 710-2 may send an ACK 852 confirming receipt of the game telemetry information 130.

Once the smart phone 710-2 receives the game strategy information 130, the smart phone 710-2 may generate an alert for the player (e.g., an audio alert, visual alert, tactile alert, olfactory alert, etc.) via an alert system provided by a thin-client application installed on the smart phone 710-2, or via a native alert system provided by the smart phone 710-2. The player may then use the smart phone 710-2 to access the game strategy information 130 to assist in playing the electronic video game. In one embodiment, the game strategy information 130 may include actual game assist files 410-*f*. In one embodiment, the game strategy information 130 may include links to game assist files 410-*f* stored on network servers such as the game strategy server 620 and game strategy information server 720. The player may review the game strategy information 130, and if additional resources are desired, the player may use the smart phone 710-2 to initiate supplemental requests for additional game assist files 410-*f* via messages for supplemental assistance operations 854.

Figure 9:
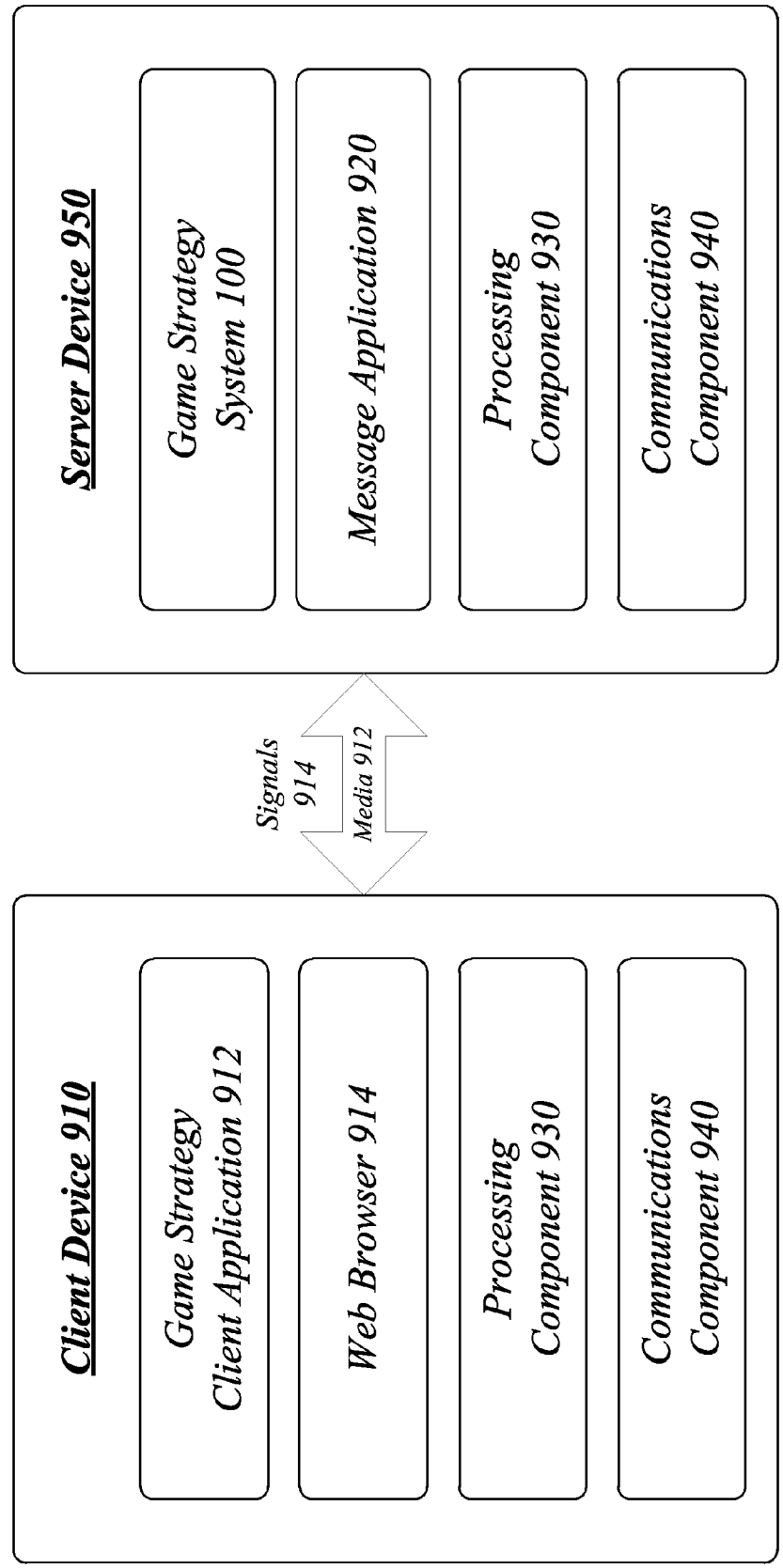
FIG. 9 illustrates an embodiment of a distributed system for the game strategy system of claim 1.

FIG. 9 illustrates a block diagram of a distributed system 900. The distributed system 900 may distribute portions of the structure and/or operations for the game strategy system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a client device 910 and a server device 950. In general, the client device 910 and the server device 950 may be the same or similar to the client device 820 as described with reference to FIG. 6. For instance, the client system 910 and the server system 950 may each comprise a processing component 930 and a communications component 940 which are the same or similar to the processing component 630 and the communications component 640, respectively, as described with reference to FIG. 6. In another example, the devices 910, 950 may communicate over a communications media 912 using communications signals 914 via the communications components 940.

The client device 910 may comprise or employ one or more client programs that operate to perform various methodologies in accordance with the described embodiments. In one embodiment, for example, the client device 910 may implement a game strategy client application 912. The game strategy client application 912 may comprise a thin-client application residing on the client device 910 that is arranged to interoperate with the game strategy application 120 of the game strategy system 100 implemented by the server device 950. The game strategy client application 912 may provide a GUI and custom GUI views to allow a player to interface with the game strategy application 120 in order to configure services and user preferences. The game strategy client application 912 may also provide custom GUI views to format, render and present game strategy information 130 for easy viewing by the player.

Additionally or alternatively, the game strategy client application 912 may include text-to-speech (TTS) components and a speech synthesizer component to audibly reproduce text files 410-3 for the player while she is engaged in playing an electronic game. In this manner, the player can remain focused on playing the electronic game while listening to game strategy information 130. Similarly, the game strategy client application 912 may include speech-to-text (STT) components and a microphone input device to convert spoken player commands to text information, which can then be forwarded to the game strategy application 120 for further processing. For instance, a player may verbally request additional game assist files 410-*f*, and the game strategy client application 912 may receive the verbal commands via a microphone and convert the verbal commands into text information using the STT components. The game strategy client application 912 may forward the text information to the game strategy application 120 implemented by the server device 950, and the game strategy application 120 may locate supplemental game assist files 410-*f*, and send the files back to the game strategy client application 912 for audible rendering by the TTS components.

The client device 910 may further implement a web browser 914. A player may use the web browser 914 to access the game strategy system 100 implemented on the server device 950 to configure services and user preferences provided by the game strategy system 100. The player may also use the web browser 914 to receive the game strategy information 130, and follow links to game strategy information 130 stored by server device 950.

The server device 950 may comprise or employ one or more server programs that operate to perform various methodologies in accordance with the described embodiments. In one embodiment, for example, the server device 950 may implement some or all of the game strategy system 100. The server device 950 may also implement one or more message applications 920 for delivering game strategy information 130 to corresponding message applications implemented by the client device 910. Examples of a message application 920 may include without limitation a text message application, email message application, short message service (SMS) application, multimedia message application (MMS), chat messages, social networking service (SNS) message application, and so forth. The embodiments are not limited in this context.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 10 illustrates one embodiment of a logic flow 1000. The logic flow 1000 may be representative of some or all of the operations executed by one or more embodiments described herein.

In the illustrated embodiment shown in FIG. 10, the logic flow 1000 may receive game telemetry information representing gameplay of an electronic game from a first client device at block 1002. For example, the game monitor component 122-1 of the game strategy application 120 may receive game telemetry information 110 representing real-time or delayed gameplay of an electronic game from a first client device 610. The game strategy application 120 may receive the game telemetry information 110 from a game system 702-k, a game server 704-l, a collection server 706, or some other source accessible to both the game system 702-k and the game strategy server 620 (e.g., a third-party service).

The logic flow 1000 may determine whether a player of the electronic game needs assistance in the gameplay based on the game telemetry information at block 1004. For example, the game monitor component 122-1 may determine whether a player of the electronic game needs assistance in the gameplay based on the game telemetry information 110. The game telemetry information 110 may comprise one or more game telemetry parameters 210-b, one of which may comprise a player identifier parameter 210-1 which may indicate an identity for a player or a client device 610, 710, which can be used to retrieve and evaluate a player assist parameter 215 stored in a player profile 214-c corresponding to the player identity. The evaluation results may be used to make a game assist decision 848.

The logic flow 1000 may send game strategy information to assist the player of the electronic game in the gameplay to a second client device at block 1006. For example, assume the game monitor component 122-1 makes a game assist decision 848 to assist the player, and stores a game assist indicator and associated game telemetry parameters 210-b as a game assist event 218-1 in the event queue 219. The game management component 122-3 may retrieve the game assist event 218-1 from the event queue 219 for processing, retrieve one or more game assist files 410-f from a local or remote datastore (e.g., datastores 124, 708, 728), and send the retrieved game assist files 410-f (or links thereto) as game strategy information 130 to assist the player of the electronic game in the gameplay to a client device 610, 650 or 710.

Figure 11:
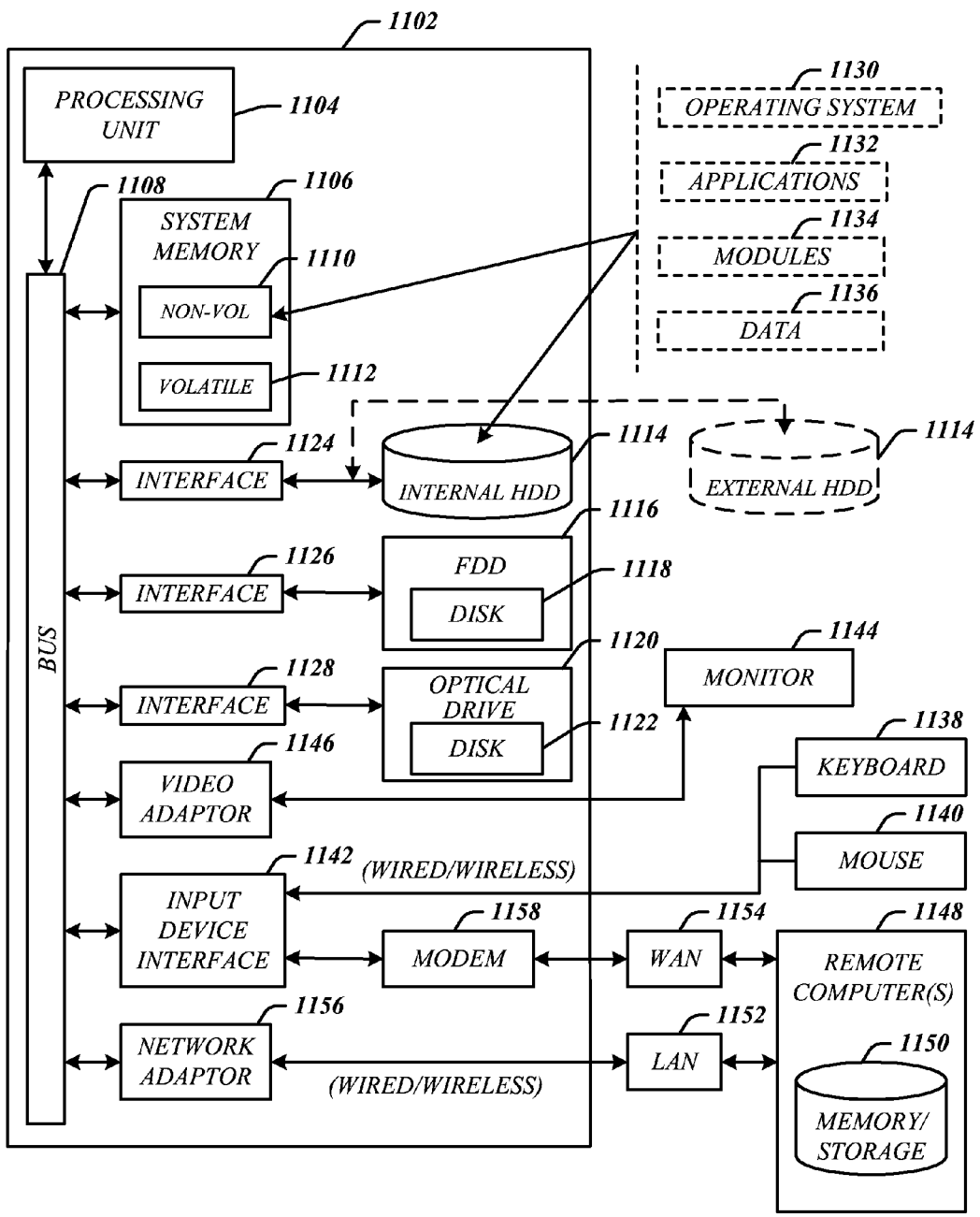
FIG. 11 illustrates an embodiment of a computing architecture.

FIG. 11 illustrates an embodiment of an exemplary computing architecture 1100 suitable for implementing various embodiments of the game strategy system 100 and/or game strategy network 700 as previously described. In one embodiment, the computing architecture 1100 may comprise or be implemented as part of an electronic device. Examples of an electronic device may include those described with reference to FIG. 6, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
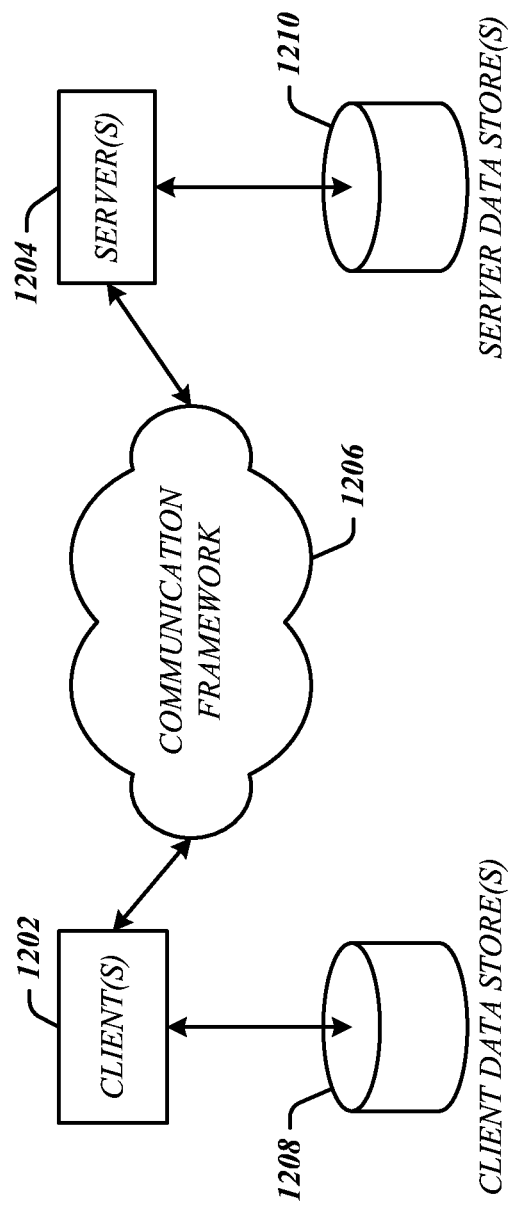
FIG. 12 illustrates an embodiment of a communications architecture.

FIG. 12 illustrates a block diagram of an exemplary communications architecture 1200 suitable for implementing various embodiments of the game strategy system 100 and/or game strategy network 700 as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 910. The servers 1204 may implement the server device 950. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processor circuit; and
a game strategy application operative on the processor circuit to receive as input game telemetry information representing gameplay by a player of an electronic game from a client device, receive during gameplay a selection to toggle game assistance on or off, retrieve a set of game assist files customized according to a game assist parameter specifying at least one of an assistance modality and a type of assistance, automatically send the set of game assist files as output game strategy information to assist the player of the electronic game in the gameplay based on the game telemetry information to a different client device when the selection of game assistance is toggled on, receive a request for supplemental game assistance from the player via the different client device, and send supplemental game assist files to the different client device in response to the request.

2. The apparatus of claim 1, the game strategy application comprising a game monitor component operative to monitor one or more game telemetry parameters of the game telemetry information, determine when the player of the electronic game needs assistance for a game event during gameplay of the electronic game based on the one or more game telemetry parameters, and generate a game assist indicator.

3. The apparatus of claim 2, the game monitor component operative to receive a player identifier parameter representing an identifier for the player, retrieve a player assist parameter from a player profile associated with the player identifier parameter, and determine whether to generate the game assist indicator for the player based on the player assist parameter.

4. The apparatus of claim 2, the game monitor component operative to receive a game identifier parameter representing an identifier for the electronic game.

5. The apparatus of claim 2, the game monitor component operative to receive a game event parameter representing an identifier for a game event of the electronic game.

6. The apparatus of claim 2, the game monitor component operative to receive a game event time parameter representing an amount of time associated with a game event of the electronic game.

7. The apparatus of claim 2, the game monitor component operative to receive a player identifier parameter, a game identifier parameter, a game event parameter, and a game event time parameter, retrieve a game event threshold parameter for a game event identified by the game event parameter of the electronic game identified by the game identifier parameter from a game profile associated with the electronic game, compare the game event time parameter with the game event threshold parameter to form comparison results, and generate the game assist indicator based on the comparison results.

8. The apparatus of claim 2, the game monitor component operative to receive a game assist parameter representing a game assist request from the player associated with a game event of the electronic game.

9. The apparatus of claim 2, the game monitor component operative to receive a player identifier parameter, a game identifier parameter, a game event parameter, and a game assist parameter, and generate the game assist indicator for the game event of the electronic game in response to the game assist parameter.

10. The apparatus of claim 2, the game monitor component operative to store the game assist indicator and associated game telemetry parameters as a game assist event in an event queue.

11. The apparatus of claim 1, the game strategy application comprising a game strategy component operative to retrieve a game assist event from an event queue, retrieve one or more game assist files for the game assist event, and send the one or more game assist files as the game strategy information to the different client device.

12. The apparatus of claim 1, the game strategy application comprising a game management component operative to receive player management requests, and manage a subscription between the client device and the game strategy application based on the player management requests.

13. The apparatus of claim 1, comprising a server device implementing the processor circuit and the game strategy application, the server device comprising a communications component operative to receive the game telemetry information from the client device and send the game strategy information to the different client device.

14. The apparatus of claim 13, the client device comprising a game system and the different client device comprising a mobile device.

15. A computer-implemented method, comprising:
receiving game telemetry information representing gameplay of an electronic game from a client device;
receiving during gameplay a selection to toggle game assistance on or off;
determining, by a processor, whether a player of the electronic game needs assistance in the gameplay based on the game telemetry information and the selection of the game assistance toggle;
retrieving a set of game assist files customized according to a game assist parameter specifying at least one of an assistance modality and a type of assistance;
sending the set of game assist files as game strategy information to assist the player of the electronic game in the gameplay to a different client device;
receiving a request for supplemental game assistance from the different client device; and
sending supplemental game assist files to the different client device in response to the request for supplemental game assistance.

16. The computer-implemented method of claim 15, comprising:
monitoring one or more game telemetry parameters of the game telemetry information;
determining when the player of the electronic game needs assistance for a game event during gameplay of the electronic game based on the one or more game telemetry parameters; and
generate a game assist indicator.

17. The computer-implemented method of claim 16, comprising:
receiving a player identifier parameter representing an identifier for the player;
retrieving a player assist parameter from a player profile associated with the player identifier parameter; and
determining whether to generate the game assist indicator for the player based on the player assist parameter.

18. The computer-implemented method of claim 16, comprising:
receiving a game identifier parameter representing an identifier for the electronic game; and
receiving a game event parameter representing an identifier for a game event of the electronic game.

19. The computer-implemented method of claim 18, comprising:
receiving a game event time parameter representing an amount of time associated with a game event of the electronic game;
retrieving a game event threshold parameter for a game event identified by the game event parameter of the electronic game identified by the game identifier parameter from a game profile associated with the electronic game;
comparing the game event time parameter with the game event threshold parameter to form comparison results; and
generating the game assist indicator based on the comparison results.

20. The computer-implemented method of claim 18, comprising:
receiving a game assist parameter representing a game assist request from the player associated with a game event of the electronic game; and
generate the game assist indicator for the game event of the electronic game in response to the game assist parameter.

21. The computer-implemented method of claim 15, comprising storing a game assist indicator and associated game telemetry parameters as a game assist event in an event queue.

22. The computer-implemented method of claim 21, comprising:
- retrieving the game assist event from the event queue;
- retrieving one or more game assist files for the game assist event; and
- sending the one or more game assist files as the game strategy information to the second client device.

23. An article of manufacture comprising a storage medium containing instructions that when executed cause a system to:
- receive game telemetry information representing gameplay of a game by a player on a client device;
- receive during gameplay a selection to toggle game assistance on or off;
- determine whether assistance in the gameplay for the player is needed based on the game telemetry information and the selection of the game assistance toggle;
- retrieve a set of game assist files customized according to a game assist parameter specifying at least one of an assistance modality and a type of assistance when assistance is determined to be needed;
- send the set of game assist files as game strategy information to assist in the gameplay to the player to a different client device;
- receive a request for supplemental game assistance; and
- sending supplemental game assist files in response to the request for supplemental game assistance to the different client device.

24. The article of manufacture of claim 23, comprising instructions that when executed enable the system to:
- monitor one or more game telemetry parameters of the game telemetry information;
- determine programmatically when assistance is needed for a game event during gameplay of the game based on the one or more game telemetry parameters; and
- generate a game assist indicator.

25. The article of manufacture of claim 23, comprising instructions that when executed enable the system to:
- receive a player identifier parameter representing an identifier for a player;
- retrieve a player assist parameter from a player profile associated with the player identifier parameter; and
- determine whether to generate a game assist indicator based on the player assist parameter.

26. The article of manufacture of claim 23, comprising instructions that when executed enable the system to:
- receive a game identifier parameter representing an identifier for the game; and
- receive a game event parameter representing an identifier for a game event of the game.

27. The article of manufacture of claim 26, comprising instructions that when executed enable the system to:
- receive a game event time parameter representing an amount of time associated with a game event of the game;
- retrieve a game event threshold parameter for a game event identified by the game event parameter of the game identified by the game identifier parameter from a game profile associated with the game;
- compare the game event time parameter with the game event threshold parameter to form comparison results; and
- generate the game assist indicator based on the comparison results.

28. The article of manufacture of claim 26, comprising instructions that when executed enable the system to:
- receive a game assist parameter representing a game assist request from a player associated with a game event of the game; and
- generate the game assist indicator for the game event of the game in response to the game assist parameter.

29. The article of manufacture of claim 23, comprising instructions that when executed enable the system to store a game assist indicator and associated game telemetry parameters from the game telemetry information as a game assist event in an event queue.

30. The article of manufacture of claim 23, comprising instructions that when executed enable the system to:
- retrieve a game assist event from an event queue;
- retrieve one or more game assist files for the game assist event; and
- send the one or more game assist files as the game strategy information.

* * * * *